United States Patent
Friedman

(10) Patent No.: US 8,527,874 B2
(45) Date of Patent: Sep. 3, 2013

(54) SYSTEM AND METHOD OF GROUPING SEARCH RESULTS USING INFORMATION REPRESENTATIONS

(75) Inventor: Nathaniel Dourif Friedman, Boston, MA (US)

(73) Assignee: Apple Inc., Cupertino, CA (US)

(*) Notice: Subject to any disclaimer, the term of this patent is extended or adjusted under 35 U.S.C. 154(b) by 1324 days.

(21) Appl. No.: 11/366,584

(22) Filed: Mar. 3, 2006

(65) Prior Publication Data

US 2007/0033169 A1    Feb. 8, 2007

Related U.S. Application Data

(63) Continuation-in-part of application No. 11/195,754, filed on Aug. 3, 2005, now Pat. No. 7,184,939, and a continuation-in-part of application No. 11/195,731, filed on Aug. 3, 2005, now Pat. No. 7,502,798, and a continuation-in-part of application No. 11/229,628, filed on Sep. 20, 2005, now Pat. No. 7,440,948.

(60) Provisional application No. 60/706,009, filed on Aug. 8, 2005.

(51) Int. Cl.
*G06F 3/00* (2006.01)

(52) U.S. Cl.
USPC ........... 715/703; 715/764; 715/769; 715/789; 715/811

(58) Field of Classification Search
USPC ......... 715/703, 789, 811, 764, 769; 707/703, 707/765, 752, 803, 705, 769
See application file for complete search history.

(56) References Cited

U.S. PATENT DOCUMENTS

| | | | |
|---|---|---|---|
| 4,897,782 A | 1/1990 | Bennett et al. | 364/200 |
| 5,287,504 A | 2/1994 | Carpenter et al. | 395/600 |
| 5,355,484 A | 10/1994 | Record et al. | 395/650 |
| 5,577,241 A | 11/1996 | Spencer | 395/605 |
| 5,864,848 A * | 1/1999 | Horvitz et al. | 1/1 |
| 6,081,750 A | 6/2000 | Hoffberg et al. | 700/17 |
| 6,272,455 B1 | 8/2001 | Hoshen et al. | 704/1 |
| 6,272,507 B1 | 8/2001 | Pirolli et al. | 707/513 |
| 6,349,137 B1 | 2/2002 | Hunt et al. | 379/265.06 |
| 6,400,996 B1 | 6/2002 | Hoffberg et al. | 700/83 |
| 6,421,737 B1 | 7/2002 | Stone et al. | 709/318 |
| 6,480,881 B1 | 11/2002 | Kubota et al. | 709/202 |
| 6,484,203 B1 | 11/2002 | Porras et al. | 709/224 |
| 6,611,877 B2 | 8/2003 | Korn et al. | 709/318 |

(Continued)

OTHER PUBLICATIONS

Microsoft, Outlook 2003 Screenshots Copyright 2003.*

(Continued)

*Primary Examiner* — Linh K Pham
(74) *Attorney, Agent, or Firm* — Park, Vaughan, Fleming & Dowler, LLP

(57) ABSTRACT

The invention is directed to a system and method of organizing search results. The invention may leverage a chronological timeline of user action information to infer relationships between objects in a search result. The search may be iterative. Search results may be graphically represented as tiles. In one embodiment, the tiles may provide a graphical representation of users associated with an object. The tiles may be updated dynamically upon user action that occurs subsequent to the search. In an alternative embodiment, search results are organized by object type and each tile represents an object within a particular object type. A default action may be associated with an object type.

20 Claims, 7 Drawing Sheets

(56) References Cited

U.S. PATENT DOCUMENTS

| | | | |
|---|---|---|---|
| 6,629,106 | B1 | 9/2003 | Narayanaswamy et al. .................. 707/104.1 |
| 6,647,383 | B1 | 11/2003 | August et al. ...................... 707/3 |
| 6,670,974 | B1* | 12/2003 | McKnight et al. ............ 715/855 |
| 6,735,602 | B2 | 5/2004 | Childress et al. ............. 707/200 |
| 6,775,665 | B1* | 8/2004 | Piersol .................................. 1/1 |
| 6,931,593 | B1 | 8/2005 | Grooters ....................... 715/717 |
| 6,996,778 | B2* | 2/2006 | Rajarajan et al. ............ 715/734 |
| 7,146,416 | B1 | 12/2006 | Yoo et al. ...................... 709/224 |
| 7,155,514 | B1 | 12/2006 | Milford ......................... 709/225 |
| 7,184,939 | B1 | 2/2007 | Trowbridge et al. .......... 702/193 |
| 7,188,317 | B1* | 3/2007 | Hazel ............................ 715/804 |
| 7,213,040 | B1 | 5/2007 | Stokes et al. .................. 707/203 |
| 7,437,358 | B2* | 10/2008 | Arrouye et al. ........................ 1/1 |
| 7,440,948 | B2 | 10/2008 | Trowbridge et al. .............. 707/7 |
| 7,487,146 | B2 | 2/2009 | Friedman .......................... 707/4 |
| 7,502,798 | B2 | 3/2009 | Trowbridge et al. ............ 707/10 |
| 7,526,478 | B2 | 4/2009 | Friedman .......................... 707/6 |
| 7,539,673 | B2 | 5/2009 | Trowbridge ..................... 707/3 |
| 7,552,445 | B2 | 6/2009 | Green ........................... 719/318 |
| 7,707,146 | B2 | 4/2010 | Friedman .......................... 707/3 |
| 7,707,284 | B2 | 4/2010 | Friedman et al. ............. 709/224 |
| 2002/0068558 | A1 | 6/2002 | Janik ............................. 455/422 |
| 2002/0069059 | A1 | 6/2002 | Smith ........................... 704/257 |
| 2002/0087649 | A1 | 7/2002 | Horvitz ......................... 709/207 |
| 2002/0143860 | A1 | 10/2002 | Catan ............................ 709/203 |
| 2002/0147805 | A1 | 10/2002 | Leshem et al. ................ 709/223 |
| 2002/0174134 | A1 | 11/2002 | Goykhman ................ 707/104.1 |
| 2003/0018634 | A1 | 1/2003 | Shringeri et al. ................. 707/4 |
| 2003/0099399 | A1 | 5/2003 | Zelinski ....................... 382/186 |
| 2004/0030753 | A1 | 2/2004 | Horvitz ......................... 709/206 |
| 2004/0049494 | A1 | 3/2004 | Kottisa .............................. 707/3 |
| 2004/0049512 | A1 | 3/2004 | Kawakita ...................... 707/100 |
| 2004/0117802 | A1 | 6/2004 | Green ........................... 719/318 |
| 2004/0267700 | A1* | 12/2004 | Dumais et al. .................... 707/2 |
| 2004/0267730 | A1* | 12/2004 | Dumais et al. .................... 707/3 |
| 2005/0108234 | A1* | 5/2005 | Oksanen et al. .................. 707/9 |
| 2005/0114374 | A1 | 5/2005 | Juszkiewicz et al. ......... 707/101 |
| 2005/0188174 | A1* | 8/2005 | Guzak et al. .................. 711/203 |
| 2006/0010120 | A1 | 1/2006 | Deguchi et al. .................... 707/4 |
| 2006/0031199 | A1* | 2/2006 | Newbold et al. ................... 707/3 |
| 2006/0156246 | A1* | 7/2006 | Williams et al. .............. 715/764 |
| 2006/0178898 | A1 | 8/2006 | Habibi .............................. 705/1 |
| 2006/0221235 | A1 | 10/2006 | Kusumoto ................... 348/553 |
| 2006/0224938 | A1 | 10/2006 | Fikes et al. .................... 715/500 |
| 2007/0033220 | A1* | 2/2007 | Drucker et al. ........... 707/103 R |
| 2007/0039049 | A1 | 2/2007 | Kupferman et al. ............ 726/22 |
| 2007/0094292 | A1 | 4/2007 | Kataoka ....................... 707/102 |
| 2010/0106727 | A1* | 4/2010 | Oral et al. ..................... 707/741 |

OTHER PUBLICATIONS

Hardman et al.; Structured Multimedia authoring; Copy Right 1993; 7 pages.*

Alonso_Gertz_Baeza-Yates; Clustering and Exploring Search Results using Timeline Constructions; 2009; 10 pages.*

Alonso et al.; Exploratory Search Using Timelines; Mar. 2004; 4 pages.*

Otto Bruggeman, [Patch] kdirwatch.cpp, Sep. 21, 2002, kde-core-devel list http://lists.kde.org/?l=kde-core-devel&m=103265283012353&w=2, 2 pages.

Josef Weidendorfer, Re:[Patch] kdirwatch.cpp, Sep. 23, 2002, kde-core-devel list http://lists.kde.org/?l=kde-core-devel&m=103279747704133&w=2, 1 page.

Sven Radej, "class KDirWatch", 2003, <http://api.kde.org/3.1-api/classref/kio/KDirWatch.html>.

Corbet, "Watching Filesystem Events with Inotify", Sep. 29, 2004, available online: <http://Iwn.net/Articles/104343/>, 5 pages.

Microsoft Corporation, "How to Use the Event Logging Utility (Logevent.exe) to Create and Log Custom Events in Event Viewer in Windows 2000", Article 0315410, Jul. 15, 2004, 3 pages.

Adiscon GmbH, "MonitorWare Agent 3.0", software documented publicly released Apr. 4, 2005, 224 pages.

Adiscon GmbH, "MonitorWare Console 3.0", software documented publicly released Oct. 14, 2006, 124 pages.

Adiscon GmbH, "MonitorWare Console Sample System Status Report", 2003, 10 pages.

* cited by examiner

SYSTEM AND METHOD OF GROUPING SEARCH RESULTS USING INFORMATION REPRESENTATIONS

CROSS-REFERENCE TO RELATED APPLICATIONS

This application claims the benefit of U.S. Provisional Patent Application Ser. No. 60/706,009, entitled "System and Method of Analyzing a Timeline and Performing Search Functions," filed Aug. 8, 2005, the contents of which are hereby incorporated by reference in their entirety. In addition, this application is a continuation-in-part of U.S. patent application Ser. No. 11/195,754, entitled "System and Method of Implementing User Action Monitoring to Automatically Populate Object Launchers," filed Aug. 3, 2005, which issued as U.S. Pat. No. 7,184,393 on Feb. 27, 2007, U.S. patent application Ser. No. 11/195,731, entitled "System and Method of Searching for Information Based on Prior User Actions," filed Aug. 3, 2005, which issued as U.S. Pat. No. 7,502,798 on Mar. 10, 2009, and U.S. patent application Ser. No. 11/229,628, entitled "System and Method of Associating Objects in Search Results," filed Sep. 20, 2005, which issued as U.S. Pat. No. 7,440,948 on Oct. 21, 2008, the entire contents of which are hereby further incorporated by reference in their entirety.

FIELD OF THE INVENTION

This invention relates to a system and method of creating and grouping information representations for search results.

BACKGROUND INFORMATION

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications are deficient because they do not enable searching for events and/or objects based on the observed actions.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. Objects may include information such as personal information, user data and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and or the computer initiated actions may be displayed in a linear format, non-linear format or other format.

According to one embodiment of the invention, a correlation determining system is provided that analyzes information associated with the user initiated actions that relate to these objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value.

According to another embodiment of the invention, a search result may be organized to provide a comprehensive listing of users associated with an object as tiles. The list of users may be dynamically updated based on any additional user action performed on the objects. According to another embodiment of the invention, a search result may be organized into tiles based on object type. For example, all music objects may be presented together. A default action may be associated with a object type. For example, a music player may be associated with a music object type.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
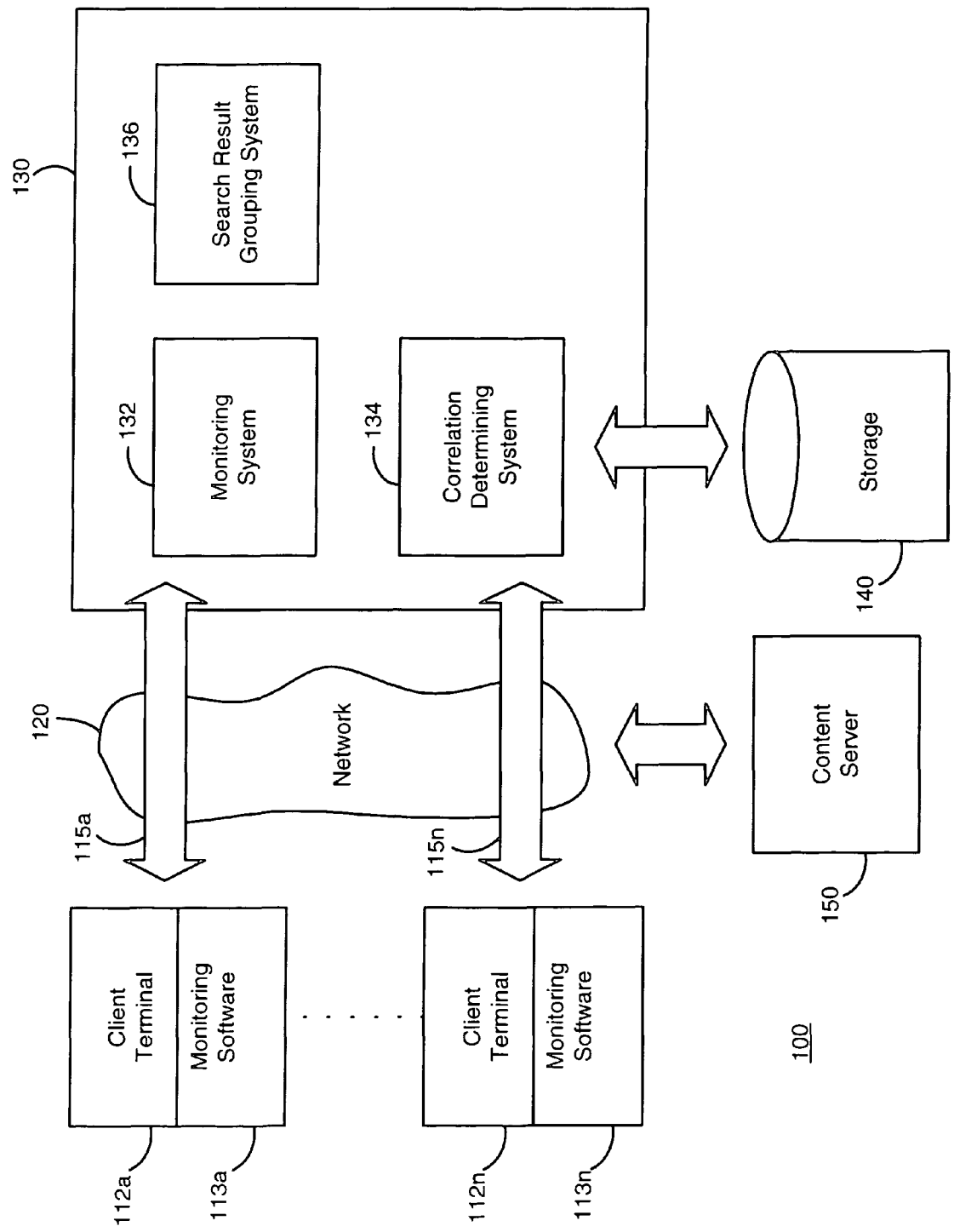
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information such as personal information, user data, or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects (e.g., applications, documents, files, email messages, on-line chats or web sites) are opened and closed, when users switch focus between different objects and/or windows, idle times, when users type on a keyboard, when users manipulate a mouse, graphical representations of the state of the user interface that can later be used to provide visual cues about previous user activity, and/or other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening a website in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, generating a reminder, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
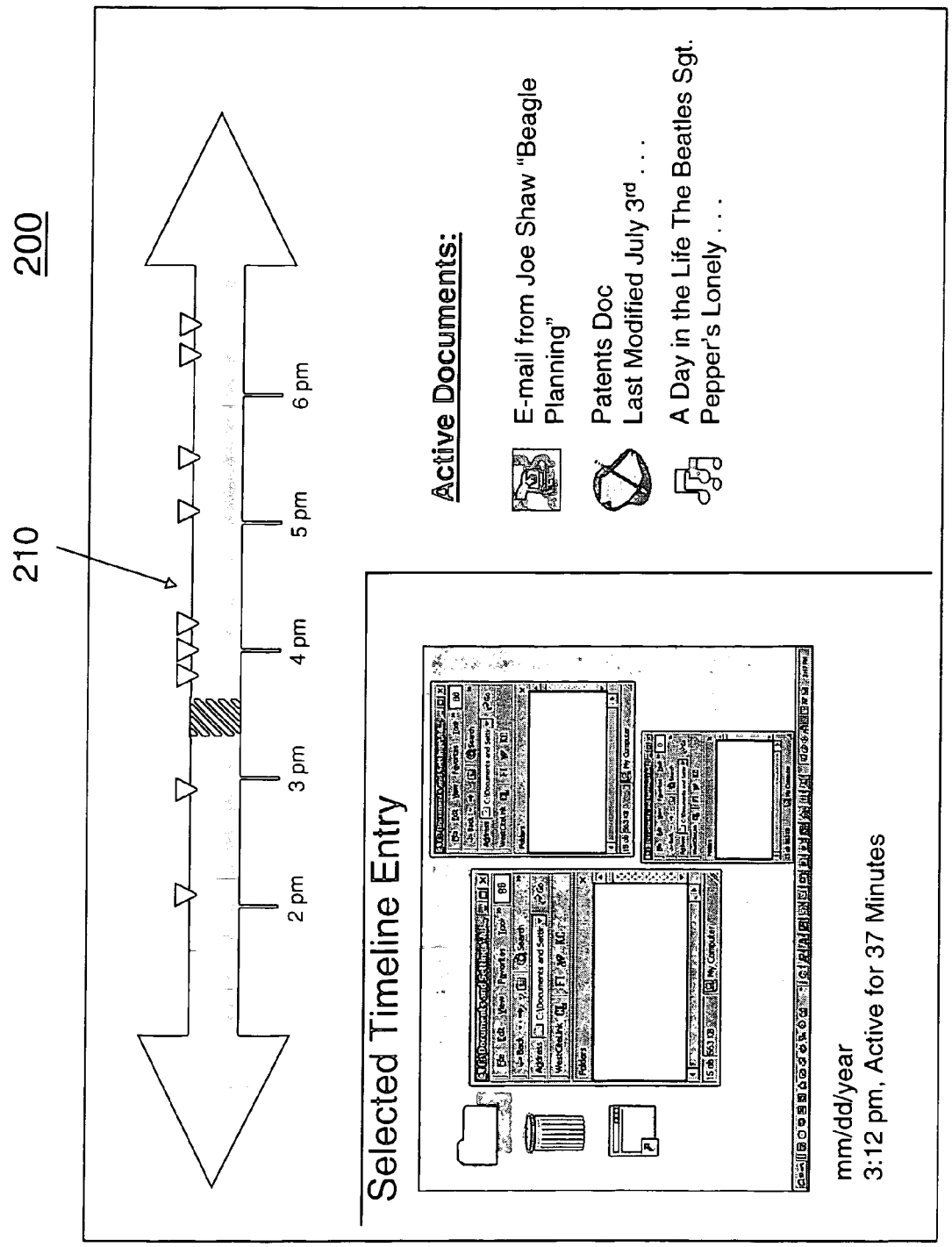
FIG. 2 illustrates an exemplary embodiment of a timeline according to an embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as, screenshots, dates that objects are accessed, times that objects are accessed, lengths of time that objects are active, and/or other information. Display 200 may also include a portion 230 that lists active objects. In another embodiment of the invention, information may be organized and displayed according to other configurations.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3:
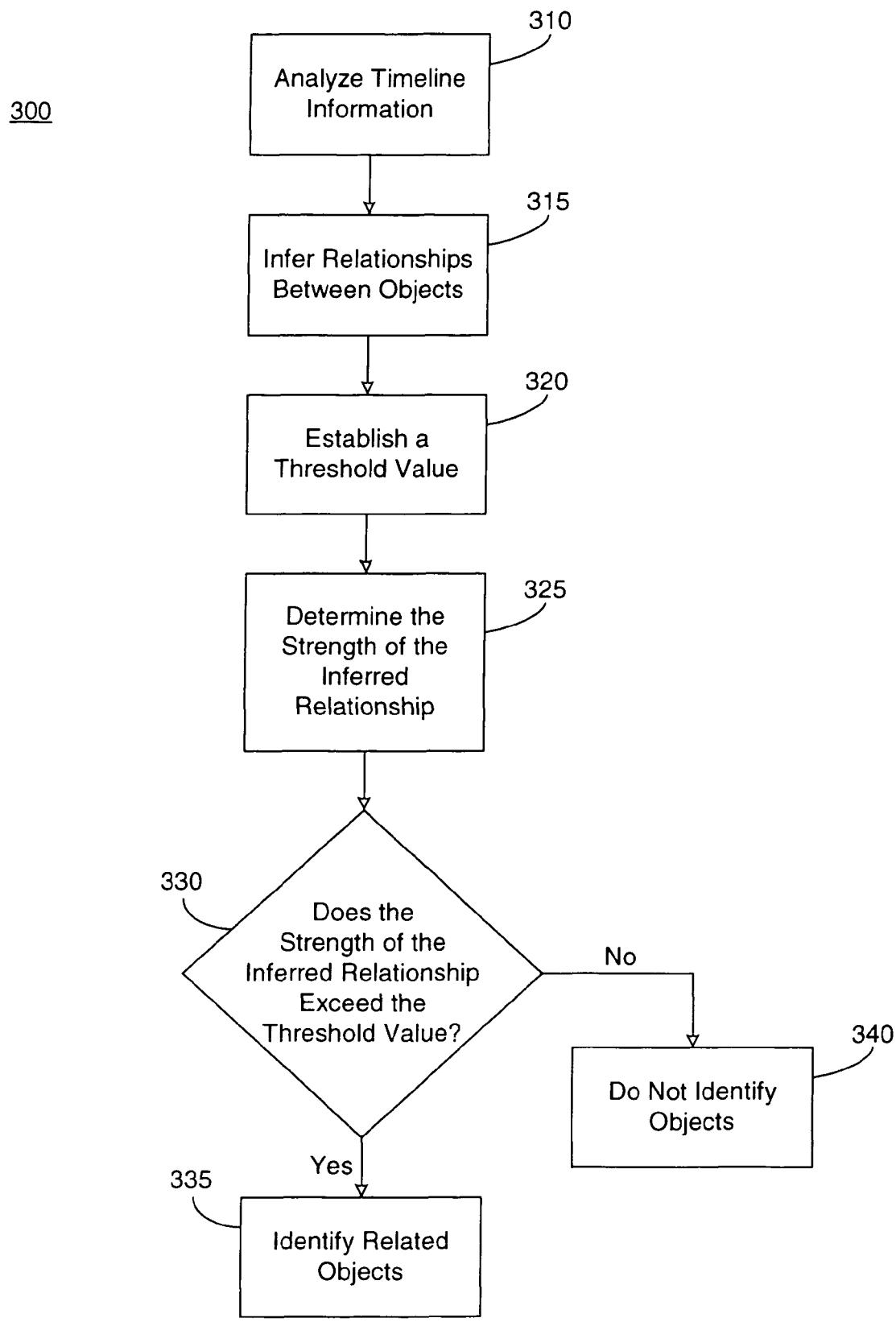
FIG. 3 illustrates a flow chart schematic for analyzing relationships between objects according to an embodiment of the invention.

According to another embodiment of the invention, information corresponding to user initiated actions and computer initiated actions may be analyzed by correlation determining system 134. FIG. 3 illustrates a flow diagram 300 of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters derived from information associated with the user initiated actions relating to these objects including, for example, a temporal order in which the objects are accessed, focus toggling between the first object and the third object, opening the first object contemporaneously with the third object, or other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors associated with the user initiated actions and the computer initiated actions. According to one embodiment of the invention, the relevance may be provided with a value based on factors including, for example, a frequency of the user initiated actions, simultaneous/sequential occurrence of user initiated action, a duration of user initiated actions, overall chronological proximity of user initiated actions, and/or other factors.

In operation 330, the strength of the relationships derived from the factors may be compared to the threshold value. In operation 335, relationships between objects may be identified if the strength of the relationship is determined to exceed a predefined threshold value. Alternatively, in step 340, relationships between objects may not be identified if the strength of the relationship is determined to be below a predefined threshold value. One of ordinary skill in the art will readily appreciate that other techniques may be used to determine the strength of relationships between objects. According to another embodiment of the invention, correlation determining system 134 may analyze parameters derived from information associated with user initiated actions and/or computer initiated actions to discover relationships between objects.

According to one embodiment of the invention, correlation determining system 134 may analyze parameters derived from information associated with user initiated actions and/or computer initiated actions to discover relationships between objects. Thus, according to one embodiment of the invention, relationships may be discovered without considering content of the objects. In an alternative embodiment of the invention, a combination of content-searching and an analysis of parameters derived from information associated with user initiated actions and/or computer initiated actions may be used to discover relationships between objects. By contrast, in the example discussed above, known systems that only rely on content-based searching to discover relationships between objects would not identify that the first object (i.e., an email message) is related to the third object (i.e., a word processing document), if the first object and the third object include different content (e.g., terminology).

According to another embodiment of the invention, user action information may be leveraged to obtain an extensive listing of users associated with a selected object. The user information may be displayed to determine a working set of users associated with the selected object. Users associated with the object may include, for example, the original author of the object, reviewers of the object, people identified with the object, and/or other users.

Figure 4:
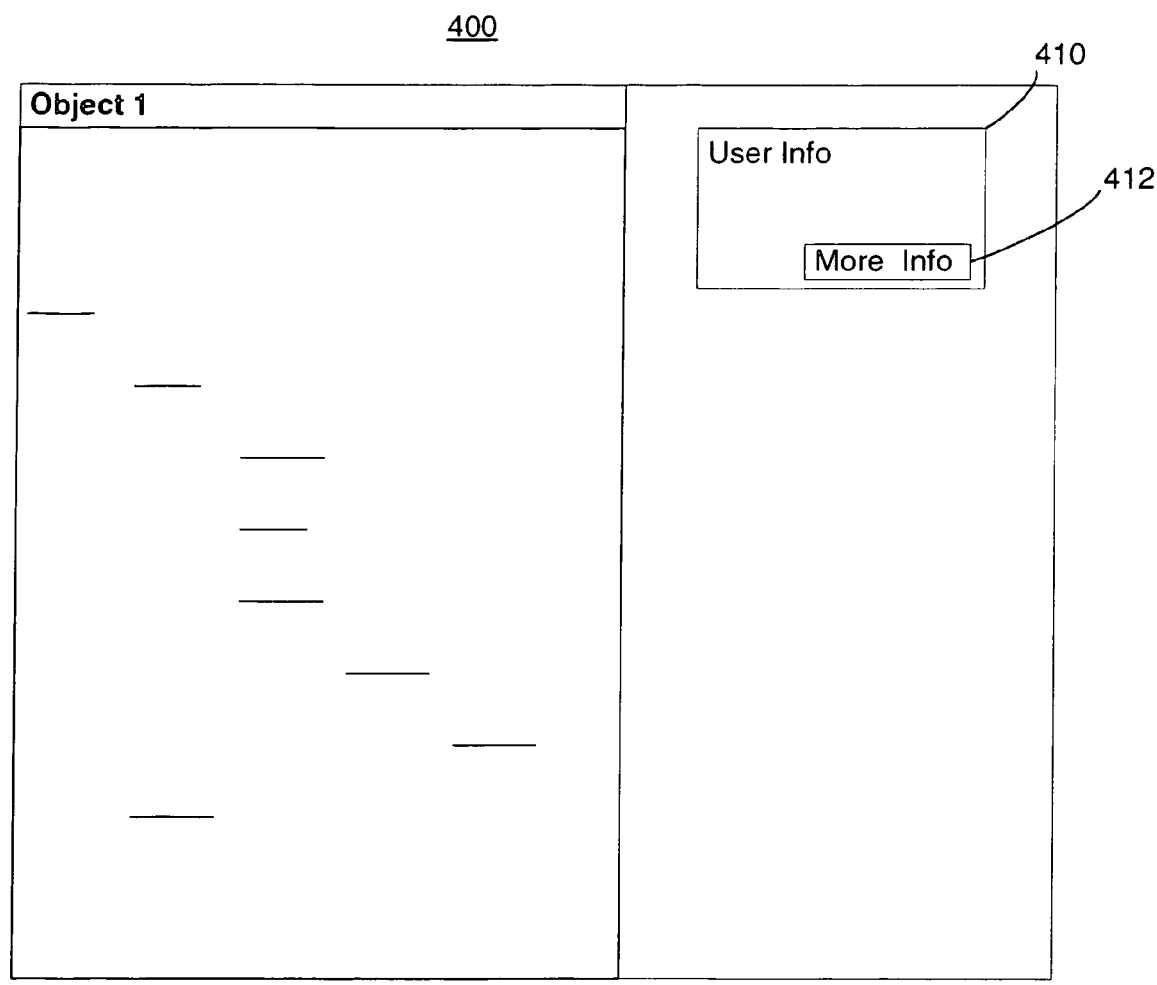
FIG. 4 illustrates a graphical user interface according to an embodiment of the invention.

The invention may create user information representations, or tiles, for displaying user information associated with the selected object. The user information for a user may be organized in a predetermined arrangement within a tile. FIG. 4 depicts an example object 400 including one or more tiles 410. Tiles 410 may be integrated with object 400, as depicted, or may form a separate display window. Each tile 410 may provide a graphical representation of a user associated with the selected object.

In particular, each tile 410 may display information in a predetermined arrangement about a user associated with the selected object. For example, the tile may display the user's name, the last action the user performed, whether the user is a creator, reviewer, or editor of the object, an icon associated with the user, a preview area and/or other user information. In this way, the invention provides a graphical representation of users associated with an object, as well as a comprehensive listing of users associated with an object.

According to some embodiments, additional information about a user may be obtained by selecting a "More Information" icon 412 within a tile. Additional information may include, for example, an address book entry associated with the user, other objects that have been accessed by the user, and/or other information. One or more pieces of the additional information may be displayed in one or more additional tiles. For example, if a user has authored a document object, a tile may be generated identifying the document object. According to some embodiments of the invention, only objects related to the focal object are displayed in the additional tiles.

Information provided in one of more of the tiles may be taken from one tile and dropped on objects in one or more tiles, program launchers, and/or other items. For example, a document object within a tile containing user information for a user may be dragged and dropped into an email message object to create an email message attachment.

According to another embodiment of the invention, universal representation tiles of search results may be provided based on object types. Tiles may represent blogs, contacts, files, folders, outside search engine results (e.g., Google), instant messages, applications, documents, email messages, chat sessions, web sites, pictures, music, and/or other objects. An object may be matched to an object type.

Each tile based on object type may include, for example, an icon, a title, a date, a preview area, an action, and/or other sections. The icon may illustrate the object type. For example, a buddy icon may represent an instant message object type, and an envelope may represent an e-mail object type.

Titles may include descriptive content from an object listed within an object type. For example, the title of a tile within an e-mail object type may include the subject of an email, the title of a tile within a web site object type may include a web page title, and the title of a tile within a music object type may include a song name for a music object. The date may include the date the object was created, modified or accessed. A preview area may provide a brief description of the object, such as a portion of the object where a search term is found. In one embodiment of the invention, a search term may be highlighted, placed in bold letters and/or provided with a different color than the other text.

An action on the tile may include one or more hyperlinks providing relevant choices for each object type. Alternatively, or in addition thereto, an action may include a default action to be associated with a particular object type. Thus, a music object type may have a default action to play in a music player or a document object type may have a default action to be opened by OpenOffice.org productivity suite.

Figure 5:
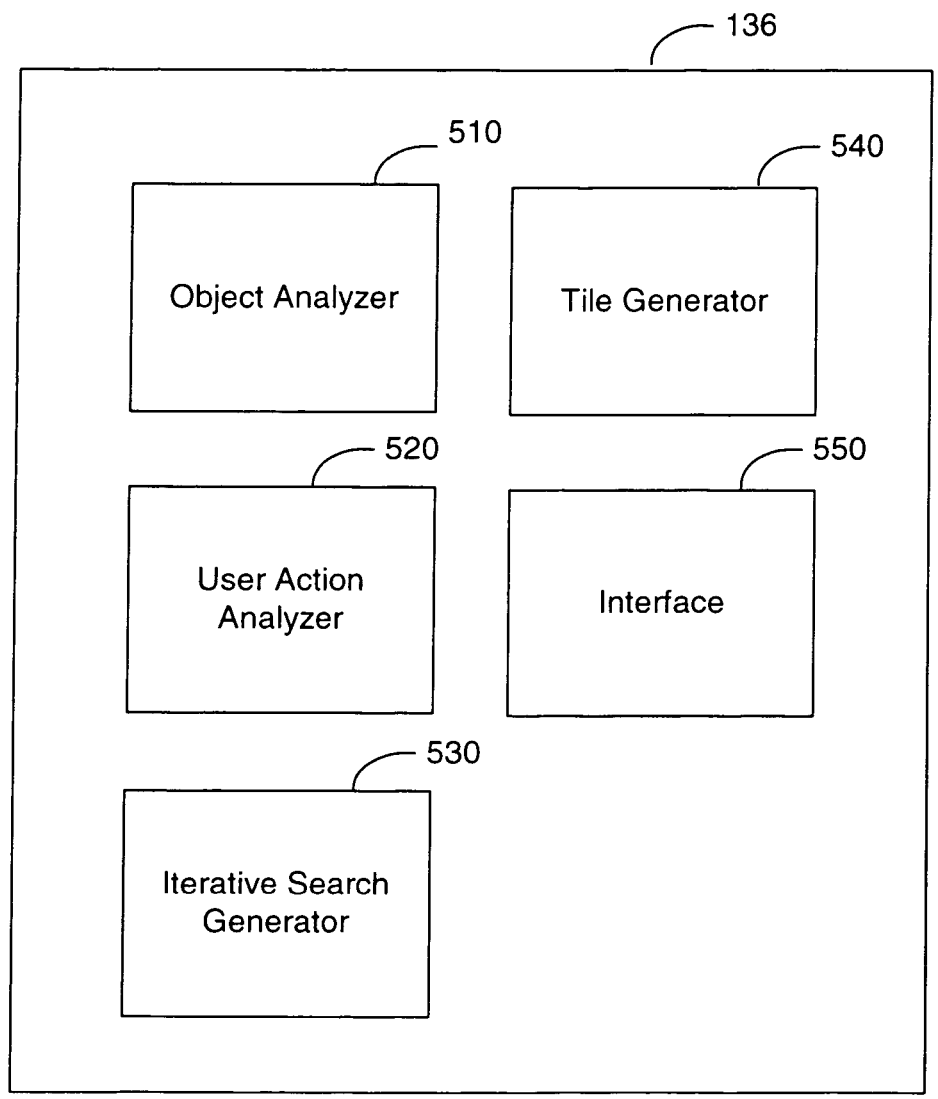
FIG. 5 illustrates a search result grouping system according to an embodiment of the invention.

FIG. 5 illustrates a search result grouping system 136 includes an interface 550 for receiving a search query. According to an embodiment of the invention, interface 550 may be adapted for receiving from a user a search query based on a selected object and/or meta data of a selected object. In a preferred embodiment, the query also includes keywords for the search.

Object analyzer 510 and user action analyzer 520 extract clues or relating to the search query for iterative search generator 530 to perform an initial search on the clues or information. For example, object analyzer 510 may extract text and/or meta data from the selected object or object type as clues. User action analyzer 520 may communicate with monitoring software 113 and/or monitoring software 132 to obtain additional clues. For example, user action analyzer 520 may analyze a chronological timeline of user action provided by the monitoring software to obtain information relating to the selected object, including extracted text, meta data and/or keywords. In one embodiment, user action analyzer 520 may identify user action information associated with a selected object based upon information extracted from the object and provided by object analyzer 510.

Iterative search generator 530 may provide an initial set of search results based upon clues provided by object analyzer 510 and user action analyzer 520. Iterative search generator 530 may provide the initial search results to object analyzer 510 and user action analyzer 520 to obtain additional clues. Iterative search generator 530 may generate an updated search query based on the clues and obtain an updated set of search results. The iterative process performed by iterative search generator 530 is termed query chaining and may continue until the clues are exhausted or a threshold is reached.

Although object analyzer 510, user action analyzer 520 and iterative search generator 530 are described as separate components performing distinct processes, one of ordinary skill in the art will appreciate that one or more components may be configured to perform these functions and that the functions may be performed using software or hardware components Tile generator 540 may organize search results received from iterative search generator 530 into tiles. In one embodiment, searches may be organized based upon a working set of users associated with an object. Tiles may provide user information representations associated with a selected object. For example, a selected object may be displayed along with a plurality of tiles, each tile containing user information associated with a unique user who interacted with the object. By leveraging user action information to infer relationships between objects, an extensive listing of users associated with the selected object may be obtained and displayed. Users associated with the object may include original authors of the object, reviewers of the object, people identified within the object, and other users.

In an alternative embodiment, a search may be organized based upon object type and tiles may provide object information representations for each object associated with a particular object type. For example, all instant message objects may be presented together, all application objects may be presented together, and all blog objects may be presented together. Object types may include blogs, contacts, files, folders, web sites, instant messages, applications, documents, email messages, chat sessions, web sites, pictures, and music. By leveraging user action information to infer relationships between objects, an extensive listing of objects associated with a selected object type may be obtained.

Tile generator 540 may update its results dynamically in the sense that tiles may be added or subtracted automatically based upon user initiated action that occurs subsequent to a search. In an alternative embodiment, tile generator 540 may update its results (e.g., adding or subtracting tiles) based upon an updated search.

Tile generator 540 supports drag-and-drop functionality. Objects may be taken from one tile and dropped on objects in one or more tiles, program launchers, and other items. For example, a document object may be dragged-and-dropped onto an email message object to create an email message attachment.

In a preferred embodiment of the invention, tile generator 540 organizes information in a predetermined arrangement within each tile. Tiles may include an icon, a title, a date, a preview area, an action, and other sections. Interface 550, such as a graphical user interface, may be provided for displaying the tiles.

Figure 6:
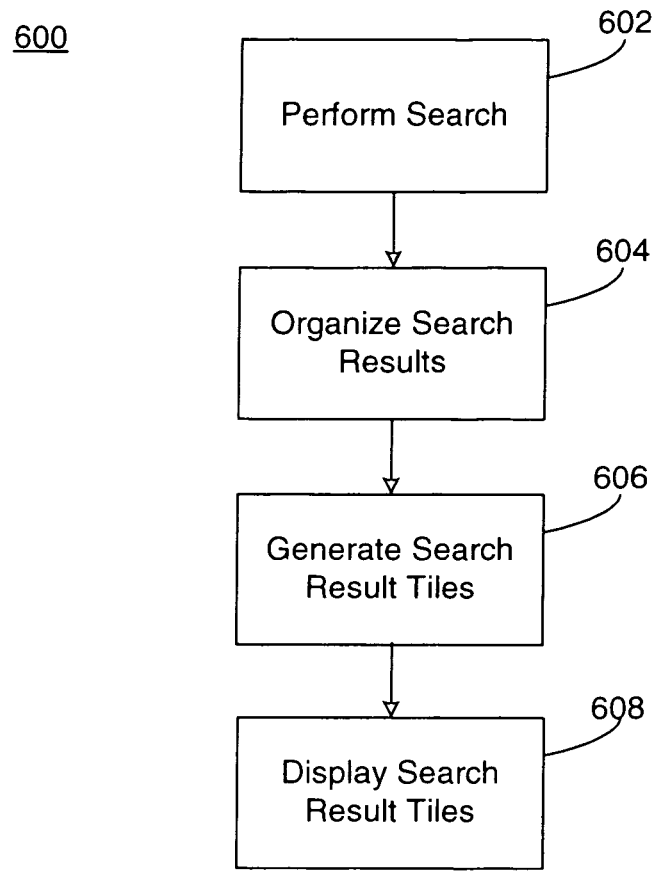
FIG. 6 illustrates a process for generating and displaying object tiles according to an embodiment of the invention.

FIG. 6 depicts a process 600 for generating and displaying tiles providing object information representations by object type. In operation 602 the system may perform a search. A user may initiate a search by submitting a query. The query may be based on a particular object, meta data associated with an object, keywords, and/or other search criteria. Additionally, clues obtained from a target object may also form a portion of the search criteria. For example, a user may wish to obtain information related to a document object. The user may input search criteria such as a name associated with the document object, the author, one or more keywords, a date or date range, and/or other search criteria.

Upon completing the search, the system may organize the search results by object type in operation 604. For example, objects may be organized into groups such as blogs, contacts, files, folders, Google search results, instant messages, applications, documents, email messages, chat sessions, web sites, pictures, music, and/or other object groups.

In operation 606 the system may then generate tiles that represent each object in the search results. According to some embodiments of the invention, text may be extracted from objects in the search result and analyzed along with meta data of the object. The analyzed text and meta data may be used to generate the tiles. User action information may also be analyzed and used in the generation of the tiles.

Tiles may include an icon, a title, a date, a preview area, an action, and other sections. The icon may illustrate the object types, such as a buddy icon for instant messages, an envelope for email, and other icons. The title for the object may be provided, such as the subject of an email, a web page title, the song name of a music object, and other titles. The date the object was created and/or last edited may be provided. A preview area may be provided that includes a brief description of the object, such as a portion of the object where a search term is found and wherein the search term is highlighted with bold letters and a different color than the other text. The action includes hyper links that present relevant choices for each object type. According to some embodiments of the invention, a default action may be associated with one or more of the tiles. For example, a music object type may have a default action to play music in a music player while a document object type may have a default action to be opened by the OpenOffice productivity suite. Other default actions may apply as would be apparent.

In operation 608 the search result tiles may be displayed on a graphical user interface. The tiles may be displayed such that tiles representing the same object type are displayed together. The display arrangement of the tiles in an object section may be based on relevance of the search results, user-defined ordering, and/or other display arrangement criteria. According to some embodiments of the invention, objects may be taken from one tile and dropped on objects in one or more tiles, program launchers, and/or other items. For example, a document object may be dragged and dropped onto an email message to create an email message attachment.

Figure 7:
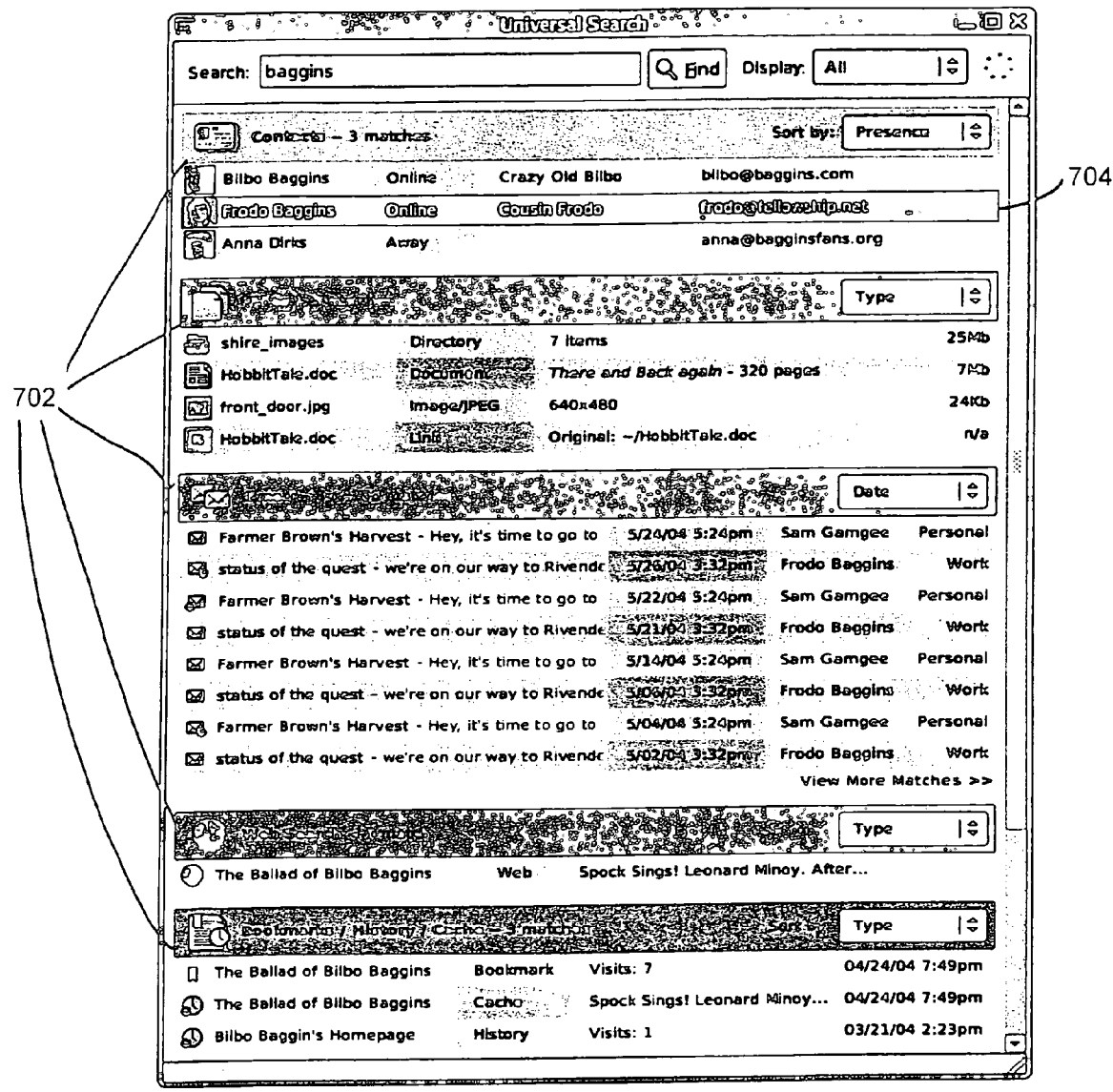
FIG. 7 illustrates a graphical user interface according to an embodiment of the invention.

FIG. 7 illustrates an example search result GUI 700, according to some embodiments of the invention. As depicted, GUI 700 presents search results organized by object types 702. For example, object types are depicted for conversations, applications, files, and blogs. One of ordinary skill in the art would recognize that other categories may be provided. Each category may provide a one or more tiles 704 representing the search results. Other tile layout formats may be used, as would be apparent.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A computer-implemented method of grouping search results using information representations, the method comprising:

receiving an input for selecting an object having a first object type;

displaying, by a server computer, on a graphical user interface, at least one tile that graphically represents at least one user associated with the selected object;

determining a chronological timeline that represents a plurality of actions performed by the at least one user, wherein the plurality of actions performed by at least one user have a plurality of chronological positions in the chronological timeline;

inferring one or more relationships between the selected object and one or more other objects associated with the at least one user from the plurality of actions represented in the chronological timeline, wherein inferring the one or more relationships includes:

identifying one or more of the plurality of actions that are related to the selected object from the plurality of chronological positions that the plurality of actions have in the chronological timeline, wherein the at least one user performed the identified one or more actions on the one or more other objects, and wherein the one or more other objects have a second object type different from the first object type; and determining that the one or more other objects are related to the selected object from a strength of the one or more inferred relationships, wherein the strength of the one or more inferred relationships is derived from the chronological positions that the identified one or more actions have in the chronological timeline, generating one or more additional tiles that graphically represent the one or more other objects related to the selected object and performed by the at least one user in response to a selection of the at least one tile that graphically represents the at least one user; and simultaneously displaying, on the graphical user interface, the one or more additional tiles that graphically represent the one or more other objects related to the selected object and performed by the at least one user, wherein the graphical user interface further organizes the at least one tile and the one or more additional tiles based on the first object type for the selected object and the second object type for the one or more other objects.

2. The method of claim 1, further comprising dynamically updating one or more of the at least one tile or the one or more additional tiles in response to the at least one user initiating one or more additional actions subsequent to the selection of the at least one tile that graphically represents the at least one user.

3. The method of claim 1, further comprising creating an application object in response to receiving a drag and drop selection of at least one of the one or more other objects graphically represented in the one or more additional tiles displayed on the graphical user interface.

4. The method of claim 1, wherein the graphical user interface organizes the one or more additional tiles in a predetermined arrangement providing one or more icons that illustrate the second object type for the one or more other objects, one or more titles that include descriptive content for the one or more other objects, one or more dates when the one or more other objects were created, and one or more available actions for interacting with the one or more other objects.

5. The method of claim 4, wherein the one or more available actions for interacting with the one or more other objects include one or more hyperlinks that initiate the one or more available actions for interacting with the one or more other objects.

6. The method of claim 5, further comprising launching an application that runs at least one of the one or more other objects in response to receiving a selection of one of the hyperlinks associated with one of the one or more other objects.

7. The method of claim 1, wherein the one or more relationships between the selected object and the one or more other objects are inferred only from the chronological positions that the identified one or more actions have in the chronological timeline and without considering content of the selected object or the one or more other objects.

8. The method of claim 1, wherein the strength of the one or more inferred relationships are further derived from content of the selected object, content of the one or more other objects, or a combination of both.

9. The method of claim 1, wherein the strength of the inferred relationships includes one or more relevancy values derived from temporal proximities between a time when the at least one user interacted with the selected object and the chronological positions that the identified one or more actions have in the chronological timeline.

10. The method of claim 9, wherein the one or more relationships between the selected object and the one or more other objects are inferred in response to the one or more relevancy values meeting or exceeding a threshold value.

11. A system for grouping search results using information representations, the system comprising:

a server computer having a processor, memory, and a graphical user interface for displaying at least one tile that graphically represents at least one user in response to an input for selecting an object associated with the at least one user, wherein the selected object has a first object type;

the server computer configured to perform operations for:

a correlation determining system, the operations performed by the server computer for the correlation determining system including:

determining a chronological timeline that represents a plurality of actions performed by the at least one user wherein the plurality of actions performed by the at least one user have a plurality of chronological positions in the chronological timeline; and inferring one or more relationships between the selected object and one or more other objects associated with the at least one user from the plurality of actions represented in the chronological timeline, wherein inferring the one or more relationships comprises:

identifies identifying one or more of the plurality of actions that are related to the selected object from the plurality of chronological positions that the plurality of actions have in the chronological timeline, wherein the at least one user performed the identified one or more actions on the one or more other objects, and wherein the one or more other objects have a second object type different from the first object type; and determining that the one or more other objects are related to the selected object from a strength of the one or more inferred relationships, wherein the strength of the one or more inferred relationships is derived from the chronological positions that the identified one or more actions have in the chronological timeline; and a tile generator, the operations performed by the server computer for the tile generator including:

generating one or more additional tiles that graphically represent the one or more other objects related to the selected object and performed by the at least one user in response to a selection of the at least one tile that graphically represents the at least one user; and causing the graphical user interface to simultaneously display the one or more additional tiles that graphically represent the one or more other objects related to the selected object and performed by the at least one user, wherein the graphical user interface further organizes the at least one tile and the one or more additional tiles based on the first object type for the selected object and the second object type for the one or more other objects.

12. The system of claim 11, wherein the operations performed by the server computer for the tile generator further include:
dynamically updating one or more of the at least one tile or the one or more additional tiles in response to the at least one user initiating one or more additional actions subsequent to the selection of the at least one tile that graphically represents the at least one user.

13. The system of claim 11, further comprising a client terminal that creates an application object in response to receiving a drag and drop selection of at least one of the one or more other objects graphically represented in the one or more additional tiles displayed on the graphical user interface.

14. The system of claim 11, wherein the graphical user interface organizes the one or more additional tiles in a predetermined arrangement providing one or more icons that illustrate the second object type for the one or more other objects, one or more titles that include descriptive content for the one or more other objects, one or more dates when the one or more other objects were created, and one or more available actions for interacting with the one or more other objects.

15. The system of claim 14, wherein the one or more available actions for interacting with the one or more other objects include one or more hyperlinks that initiate the one or more available actions for interacting with the one or more other objects.

16. The system of claim. 15, the server computer further configured to perform operations for:
an application that runs at least one of the one or more other objects in response to a selection of one of the hyperlinks associated with one of the one or more other objects.

17. The system of claim 11, wherein inferring the one or more relationships between the selected object and one or more other objects associated with the at least one user from the plurality of actions represented in the chronological timeline comprises:
inferring the one or more relationships between the selected object and the one or more other objects only from the chronological positions that the identified one or more actions have in the chronological timeline and without considering content of the user selected object or the one or more other objects.

18. The system of claim 11, wherein the operations performed by the server computer for the correlation determining system further include:
deriving the strength of the one or more inferred relationships based on content of the selected object, content of the one or more other objects, or a combination of both.

19. The system of claim 11, wherein the strength of the inferred relationships includes one or more relevancy values derived from temporal proximities between a time when the at least one user interacted with the selected object and the chronological positions that the identified one or more actions have in the chronological timeline.

20. The system of claim 11, wherein the operations performed by the server computer for the correlation determining system further include:
inferring the one or more relationships between the selected object and the one or more other objects in response to the one or more relevancy values meeting or exceeding a threshold value.

* * * * *